Patented Apr. 7, 1953

2,634,292

UNITED STATES PATENT OFFICE 2,634,292

CYCLOHEXENYL ETHYL AMINE AND PROCESS FOR THE MANUFACTURE THEREOF

Joseph Hellerbach, Basel, Switzerland, assignor to Hoffmann-La Roche Inc., Nutley, N. J., a corporation of New Jersey No Drawing. Original application May 27, 1950, Serial No. 164,849. Divided and this application October 3, 1951, Serial No. 249,631. In Switzerland July 29, 1949

2 Claims. (Cl. 260—563)

This invention relates to derivatives of morphinane and salts thereof and also to intermediates used in the manufacture of said derivatives and salts thereof, as well as to processes for the manufacture of these compounds.

It has been found, according to this invention, that morphinane and the derivatives thereof can be prepared according to a process which may be represented by the following formulae scheme:

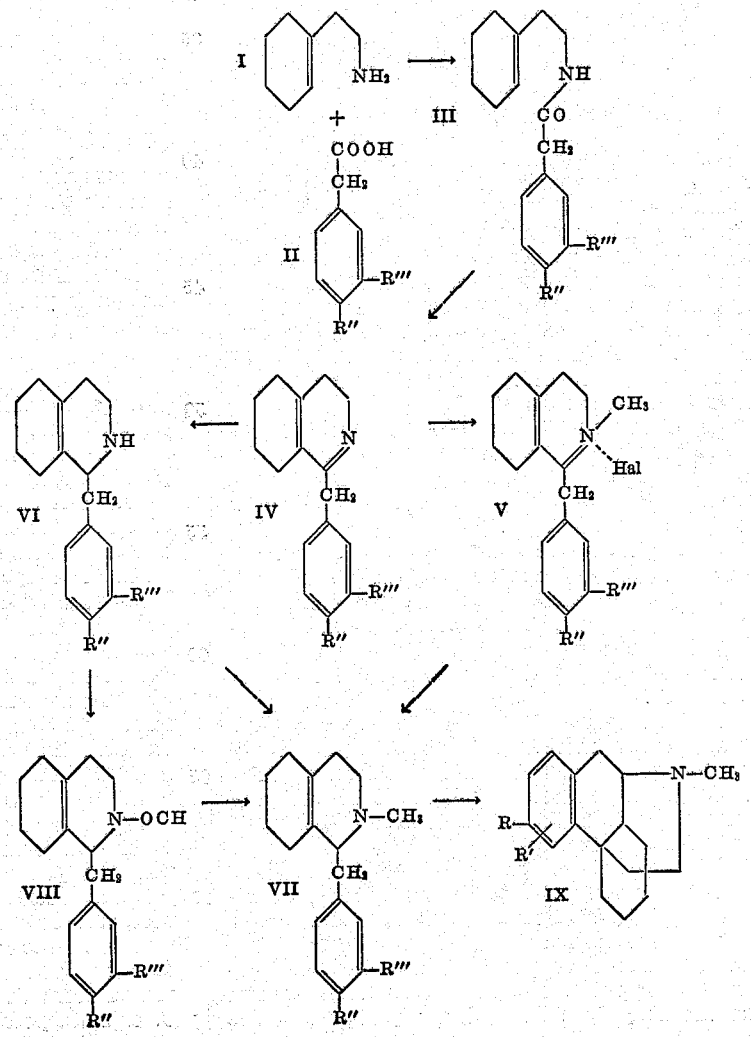

in which R and R′ are the same or different and are each a hydrogen atom or an OH, OCH₃ or OCOCH₃ group, and R″ and R‴ are the same or different and are each a hydrogen atom or an OCH₃ group.

The compounds of the general formulae I, III, IV, V, VI and VIII shown above are all new compounds, whilst the compound

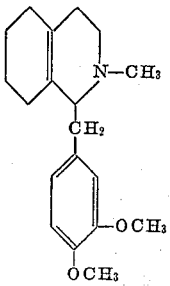

is new as well as compounds of the general formula IX with the exception of N-methyl-morphinane, 3,4-dihydroxy - N - methyl-morphinane and 3-methoxy - 4 - hydroxy-N-methyl-morphinane and it is to be understood that the present invention comprises all these new compounds.

As starting material is used cyclohexen-(1)-yl-ethylamine (I) which itself may be obtained either from cyclohexen - (1) - yl - acetonitrile (Harding, Haworth, Perkin, J. Chem. Soc. (London), vol. 93, year 1908, pages 1945, 1956) or from cyclohexen-(1)-yl-acetamide (Wallach, "Liebigs Annalen der Chemie," vol. 347, year 1906, page 328; "Liebigs Annalen der Chemie," vol. 353, year 1907, page 292; Darzens, Rost, Comptes Rendus, vol. 153, year 1910, page 774) by reduction with lithium aluminium hydride.

According to the present invention the amine (I) is reacted with phenyl-acetic acid or a substituted phenyl-acetic acid (II) to form the corresponding phenyl-acetic acid (cyclohexenylethyl)-amide (III). This latter compound is converted under cyclization into the corresponding 1-benzyl - 3,4,5,6,7,8 - hexahydroisoquinoline (IV), this conversion being suitably performed by means of condensing phosphorus compounds, such as phosphorus pentoxide or phosphorus halides. The methylation of IV into the N-methylated octahydro compound (VII) may be performed in various ways:

(a) By reacting a methylhalide with the hexahydro base (IV), the quaternary salt (V) is obtained, which, upon catalytic hydrogenation, yields the hydrohalide of the N-methylated octahydro compound (VII).

(b) The hexahydro base (IV) may be reduced, for instance, by catalytic hydrogenation, into the corresponding benzyl-octahydro compound (VI), and the latter may be reacted with formaldehyde and subsequently reduced, so as to produce the desired 1-benzyl - 2 - methyl-octahydro-isoquinoline (VII).

(c) Upon treating a 1-benzyl-1,2,3,4,5,6,7,8-octahydroisoquinoline (VI) with ethyl formate, the formyl compound (VIII) is formed, which yields, when reduced by means of lithium aluminium hydride, the corresponding 1-benzyl-2-methyl-octahydroisoquinoline (VII).

The 1-benzyl-2-methyl-octahydroisoquinolines (VII) are converted into the N-methyl-morphinanes (IX) by heating with acid cyclizing agents, such as phosphoric acid or hydro halic acids and the like. If the reaction is at the same time performed in a suitable manner, a hydrolyzation of the methoxy to free hydroxy groups may be effected. Free hydroxy groups (of the hydroxy- or the dihydroxy-N-methyl-morphinane respectively) can be methylated or acetylated.

The compounds or the salts thereof, which are obtained according to the present process, are effective as analgesics.

In the following examples "parts" means "parts by weight" unless otherwise stated.

EXAMPLE 1

CYCLOHEXEN-(1)-YL-ETHYLAMINE (a) *From cyclohexen-(1)-yl-acetamide*

139 parts of cyclohexenyl-acetamide are added in portions, with stirring and ice-cooling, to a solution of 76 parts of lithium aluminium hydride in 6000 parts of water-free ether, the addition being conducted under nitrogen. The reaction mixture is allowed to stand for 6 hours at room temperature and thereafter kept boiling for 15 minutes. Afterwards the excess of lithium aluminium hydride is decomposed slowly with water and concentrated sodium hydroxide is added dropwise until the ether solution becomes completely clear. The ethereal solution is decanted from the lithium and aluminium hydroxide and the residue is washed twice with 150 parts of ether each time. The united ether solutions are dried with potassium carbonate and concentrated, and the amine is distilled in the vacuum of the water-jet pump. (Boiling point 75–78° C. under a pressure of 15 mm.)

(b) *From cyclohexen-(1)-yl-acetonitrile*

121 parts of cyclohexenyl-acetonitrile dissolved in 800 parts of water-free ether are added dropwise, with stirring, to a solution of 42 parts of lithium aluminium hydride in 2000 parts of water-free ether, the addition being performed at 0° C. under nitrogen; stirring is continued for 2 hours at 0° C.

After decomposition of the excess of lithium aluminium hydride with water and addition of concentrated sodium hydroxide, the reaction product is isolated according to the method described in part (a) of this example.

EXAMPLE 2

N-METHYL-MORPHINANE

To a solution of 125 parts of cyclohexenylethylamine in 250 parts of benzene are added slowly, with stirring and ice-cooling 85 parts of phenyl-acetic acid chloride in 170 parts of benzene. Thereafter the reaction product is allowed to stand for 30 minutes at room temperature and heated for additional 30 minutes on a waterbath. The cyclohexenyl - ethyl - amine - hydrochloride is separated by filtration, the filtrate is washed with sodium hydrogen carbonate and water, and the solvent is distilled off; the residue which solidifies quickly is phenyl-acetic acid (cyclohexen-(1)-yl-ethyl)-amide. The raw material melts at 52–55° C., after recrystallization from a mixture of benzene and petroleum ether at 69–70° C., and boils at 160° C. (temperature of the oil-bath) under a pressure of 0.01 mm.

243 parts of phenyl acetic acid (cyclohexenylethyl)-amide are heated in an oil-bath together with 1200 parts of benzene and 730 parts of phosphorous pentoxide at 90° C. for 45 minutes and thereafter left standing for 2 hours at room temperature. Ice is then added with cooling to the reaction mixture, and the aqueous part is separated from the benzene. Upon addition at 0° C. of solid potassium hydroxide to the aqueous part, a base separates and is taken into ether. The ether solution is dried, the solvent is driven off and the 1-benzyl-3,4,5,6,7,8-hexahydroisoquinoline is obtained as an oil. The same product is formed by phenyl-acetic acid (cyclohexenyl-ethyl)-amide being boiled for 3 hours with phosphorous oxychloride in benzene.

The raw material is dissolved in 80 parts of water-free acetone, to this solution is added a mixture of 200 parts of methyl-bromide and 320 parts of water-free acetone and the whole is allowed to stand at room temperature for 12 hours. The residue, which remains after the acetone having been removed in vacuo at room temperature, is dissolved in water and extracted with ether. The aqueous solution of the quaternary salt is hydrogenated in a pressure autoclave for 19 hours together with a concentrated solution of 56 parts of potassium hydroxide in methanol in the presence of Raney-nickel, at room temperature and under a pressure of 50 atm. The hydrogenation product is freed from the catalyst by filtration and the methanol is substantially removed by distillation. It is taken into benzene and the benzene solution is washed with water. After distilling off the benzene, there remains an oil which is 1-benzyl-2-methyl-1,2,3,-4,5,6,7,8 - octahydroisoquinoline. Boiling point 106–108° C. under a pressure of 0.01 mm; melting point of the hydrochloride 195–196° C.

241 parts of 1-benzyl-2-methyl-octahydroisoquinoline which have been purified over the hydrochloride, are heated for 70 hours at 140–150° C. with 720 parts of 100 per cent. phosphoric acid. After cooling down, the reaction mixture is dissolved in 1000 parts of ice-water, adjusted to a weak phenolphthalein-alkaline reaction by means of concentrated ammonium hydroxide and extracted with benzene. After evaporation of the benzene, the remaining N-methyl-morphinane is distilled in high vacuo. Boiling point 118–120° C. under a pressure of 0.04 mm. Melting point of the phosphate 141–145° C.

EXAMPLE 3

3-HYDROXY-N-METHYL-MORPHINANE 125 parts of cyclohexenyl-ethylamine are mixed up with 300 parts of benzene. To this mixture is added within 30 minutes a solution of 92.3 parts of p-methoxy-phenyl-acetic acid chloride in 92 parts of benzene. The reaction starts immediately and cyclohexenyl-ethylamine-hydrochloride separates. After having been stirred up at room temperature for additional 2 hours, the cyclohexenyl-ethylamine-hydrochloride is separated by filtration. The benzene solution is washed with water, the benzene is distilled off, and the residue is crystallized from petroleum ether (boiling range 80–120° C.). The p-methoxy-phenyl-acetic acid (cyclohexenyl - ethyl)-amide melts at 79–81° C.

273 parts of p-methoxy-phenyl-acetic acid (cyclohexenyl-ethyl)-amide are dissolved in 1000 parts of benzene and boiled under reflux for 3 hours together with 307 parts of phosphorus oxychloride. After cooling down, the excess of phosphorus oxychloride is decomposed by means of ice-water, and the hydrochloride of 1-(p-methoxy - benzyl) - 3,4,5,6,7,8 - hexahydroisoquinoline, which is relatively difficultly soluble in water, is extracted from the benzene with water. The aqueous solution is made alkaline by means of about 30 per cent aqueous sodium hydroxide, the precipitated base is taken up in ether, the ether solution is dried with potassium carbonate and then concentrated.

The remaining 1-(p-methoxybenzyl)-3,4,5,6,7,8-hexahydroisoquinoline (approximately 220 parts) is dissolved in 5 times its quantity of methyl alcohol and hydrogenated in the presence of 50 parts of Raney-nickel. After no more hydrogen is taken up, the solution is freed from the catalyst and acidified so far as just to become acid to congo by means of 100 parts of 48 per cent hydrobromic acid. After removal of methyl alcohol, the crystalline residue is recrystallized from water. The 1-(p-methoxy-benzyl)-1,2,3,4,5,6,7,8-octahydroisoquinoline - hydrobromide melts at 200–201° C.

A solution of 338 parts of 1-(p-methoxybenzyl)-1,2,3,4,5,6,7,8 - octahydroisoquinoline - hydrobromide in water is adjusted to a distinctly phenolphthalein-alkaline reaction by means of about 100 parts of technical, aqueous sodium hydroxide (about 30 per cent). The base which separates is taken up in benzene and the benzene is distilled off. The residue which is the free 1-(p-methoxy-benzyl)-octahydroisoquinoline-base is dissolved in 600 parts of methanol. It is thereafter allowed to stand for 2 hours with 90 parts of a formalin solution of approximately 40 per cent. Thereupon it is hydrogenated under slight pressure in the presence of 100 parts of Raney-nickel. The calculated amount of hydrogen is absorbed quickly. The catalyst is then separated, and the methyl-alcoholic solution is adjusted to a weak congo acid reaction by means of concentrated hydrochloric acid. The methanol is driven off, the residue is dissolved in water, the base is separated by the addition of ammonium hydroxide and it is taken up in benzene. After having been freed from the benzene, the base is distilled in high vacuo. The 1-(p-methoxy-benzyl)-2-methyl-1,2,3,4,5,6,7,8-octahydroisoquinoline boils at 117–119° C. under a pressure of 0.008 mm. The oxalate melts at 163–164° C.

The same product is formed when, after the reaction with formalin, the p-methoxy-benzyl-octahydroisoquinoline is heated with formic acid.

271 parts of 1-(p-methoxy-benzyl)-2-methyl-1,2,3,4,5,6,7,8-octahydroisoquinoline are dissolved in 1500 parts of 100 per cent phosphoric acid and heated for 70 hours at 140–150° C. Thereafter, the mixture is cooled down, dissolved in 1000 parts of ice-water and the solution is adjusted to a weak phenolphthalein-alkaline reaction by means of concentrated ammonium hydroxide. The 3-hydroxy-N-methyl-morphinane which separates (the methyl ether has been mostly hydrolized by the heating with phosphoric acid) is taken up in a mixture of benzene-butanol (1:1) and the raw base is obtained by concentrating and boiling up with acetone. The base is purified over the hydrobromide which melts at 193–195° C. The 3-hydroxy-N-methyl-morphinane has a melting point of 251–253° C. and the tartrate melts at 147° C.

3-methoxy-N-methyl-morphinane, which is yielded by methylation of the 3-hydroxy compound, melts at 81–83° C., and the hydrobromide thereof has a melting point of 91–93° C. The hydrobromide of the corresponding 3-acetoxy derivative melts at 210–212° C., or, with water of crystallization, at 155–159° C., whereas the free base has its melting point at 68–70° C.

EXAMPLE 4

DIHYDROXY-N-METHYL-MORPHINANE 125 parts of cyclohexenyl-ethylamine and 196 parts of homoveratric acid are boiled in 1200 parts of xylol, whereby the water which separates is gradually taken off by means of a water-separator. After the calculated amount of water having been separated (about 5 hours), the reaction product is left to crystallize and the crystallized amide which forms long needles is filtrated and washed with petroleum ether. After recrystallization from petroleum ether, the homoveratric acid (cyclohexen-(1)-yl-ethyl)-amide melts at 96° C. 303 parts of homoveratric acid (cyclohexenyl-ethyl)-amide are dissolved in 1500 parts of benzene and boiled under reflux for 3 hours with 183 parts of phosphorus oxychloride, whereby a salt, which is insoluble in benzene, gradually separates in a crystalline state. The crystallization is completed by the reaction product being allowed to stand for two hours at 0° C. The crystals are separated by filtration. The precipitate is dissolved in water and made alkaline with ice-cooling by means of approximately 30 per cent aqueous potassium hydroxide. The base which separates is taken up in ether. The ethereal solution is dried and concentrated.

The same hexahydro base is yielded when the homoveratric acid (cyclohexenyl-ethyl)-amide is heated in an oil-bath for 45 minutes at 90° C. with phosphorus pentoxide in benzene.

The 1-(3',4'-dimethoxy-benzyl)-3,4,5,6,7,8-hexahydroisoquinoline (approximately 240 parts) is dissolved in 5 times its amount of methyl alcohol and is hydrogenated in the presence of 80 parts of Raney-nickel-paste. After the absorption of hydrogen is completed, the catalyst is separated by filtration, the methanol is distilled off in vacuo, the residue is dissolved in about 300 parts of isopropyl alcohol, and the solution is adjusted to a congo acid reaction by means of 48 per cent. hydrobromic acid. The 1-(3',4'-dimethoxybenzyl)-1,2,3,4,5,6,7,8-octahydroiso-quinoline-hydrobromide precipitates, is filtered and recrystallized from methanol. It melts at 235–236° C., whereas the hydrochloride has a melting point of 198–200° C.

A solution of 367 parts of 1-(3',4'-dimethoxybenzyl)-1,2,3,4,5,6,7,8-octahydroisoquinoline-hydrobromide in water is adjusted to a phenolphthalein-alkaline reaction with concentrated aqueous sodium hydroxide. The precipitated base is taken up in ether, the ether solution is dried and concentrated. The residue, which is the free dimethoxybenzyl-octahydroisoquinoline-base, is dissolved in 880 parts of methanol. The solution formed is allowed to stand overnight with 128 parts of 40 per cent. aqueous formaldehyde and thereafter hydrogenated in the presence of 110 parts of Raney-nickel. After the absorption of the calculated amount of hydrogen, the hydrogenation stops. The methanolic solution is separated from the catalyst and freed from the methanol in a slight vacuo. In order to liberate the base from water, the residue is dissolved in benzene and concentrated in vacuo, and this operation is repeated several times. The 1-(3',4'-dimethoxy-benzyl)-2-methyl-1,2,3,4,5,6,7,8-octahydroisoquinoline is distilled in high vacuo. Boiling point 135° C. under a pressure of 0.001 mm. The hydrochloride melts at 229° C., the oxalate melts at 125–127° C.

This same base can be obtained in two other ways:

(a) Upon reacting 1-(3',4'-dimethoxybenzyl)-hexahydroisoquinoline with methyl-bromide in acetone, the quaternary salt is formed, which, when worked up and hydrogenated in a manner similar to that described in Example 2, yields the N-methylated octahydro base.

(b) Upon heating the 1-(3',4'-dimethoxybenzyl)-1,2,3,4,5,6,7,8-octahydroisoquinoline with ethyl formate, the corresponding formylamine compound melting at 92–93° C. is formed, which, when reduced by means of lithium aluminium hydroxide, also yields the N-methylated octahydro base.

301 parts of 1-(3',4'-dimethoxybenzyl)-2-methyl-1,2,3,4,5,6,7,8,-octahydroisoquinoline are dissolved in 900 parts of 100 per cent. phosphoric acid and the mixture is heated for 70 hours at 140–150° C. The reaction product is then cooled down, dissolved in 1000 parts of ice-water and made weakly alkaline by means of concentrated ammonium hydroxide. The precipitated base of the 3,4-(or 2,3)-dihydroxy-N-methyl-morphinane (the methyl ether is mostly hydrolized by the heating with phosphorus acid) is taken up in ether and, after the ether having been removed, it is purified over the salicylate which has its melting point at 176–180° C. The 3,4-(or 2,3)-dihydroxy-N-methyl-morphinane is crystallized from ethyl acetate and has a melting point of 246–247° C. The hydrobromide, which is difficulty soluble in water, melts at 248–250° C.

This application is a division of my copending application No. 164,849, filed May 27, 1950.

I claim:

1. Cyclohexen-(1)-yl-ethylamine having the formula

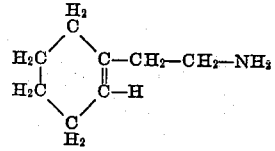

2. A process of preparing cyclohexen-(1)-yl-ethylamine which comprises subjecting cyclohexen-(1)-yl-acetonitrile to the reductive action of lithium aluminum hydride.

JOSEPH HELLERBACH.

No references cited.